(No Model.)  2 Sheets—Sheet 1.

E. E. RIES & A. H. HENDERSON.
UNDERGROUND CONDUIT AND GRIP FOR ELECTRIC RAILWAYS.

No. 383,770. Patented May 29, 1888.

WITNESSES:
Leopold Ries
S. Oettinger

INVENTORS,
ELIAS E. RIES.
A. H. HENDERSON.
Elias E. Ries,
ATTORNEY.

(No Model.)  2 Sheets—Sheet 2.

E. E. RIES & A. H. HENDERSON.
UNDERGROUND CONDUIT AND GRIP FOR ELECTRIC RAILWAYS.

No. 383,770. Patented May 29, 1888.

WITNESSES
Dan'l Fisher.
Leopold Ries.

INVENTORS
Elias E. Ries
A. H. Henderson
BY THEIR ATTORNEY, Elias E. Ries.

United States Patent Office.

ELIAS E. RIES AND ALBERT H. HENDERSON, OF BALTIMORE, MARYLAND.

UNDERGROUND CONDUIT AND GRIP FOR ELECTRIC RAILWAYS.

SPECIFICATION forming part of Letters Patent No. 383,770, dated May 29, 1888.

Application filed September 17, 1885. Serial No. 177,379. (No model.)

*To all whom it may concern:*

Be it known that we, ELIAS E. RIES, of Baltimore, in the State of Maryland, and ALBERT H. HENDERSON, of the same city and State, have invented certain new and useful Improvements in Underground Conduits and Current-Collectors for Electric Railways, of which the following is a specification, reference being had to the accompanying drawings, forming a part thereof.

This invention relates to certain improvements in underground conduits for the conducting rail or rails of electric railways and in contact or current-collecting devices for the same; and it consists, first, in forming the conduit of a suitable plastic non-conducting material, either in the form of a continuous tube or conduit molded on the spot from such material while in a plastic state, or in the form of prepared sections of the material of suitable length, which are placed in position and then joined or cemented to one another by a joint formed of the plastic material; second, in providing the conduit or the sections thereof with one or more longitudinal grooves, in which the conductors may subsequently be placed and securely held; third, in details of construction whereby the conducting-rails are protected against and are kept clear of all foreign matter that may enter the conduit, and whereby any water or surface-drainage entering the conduit through the surface-slot is carried away without danger of coming in contact with the conducting-rails, and thereby grounding or short-circuiting the current; fourth, in details of construction of the conducting-rail and contact-wheels, whereby better electrical connection is maintained between them, and the danger from interruption or "sparking" lessened, without the rapid wear incident to the use of brushes for this purpose and the consequent deposit of particles of metal in the conduit; fifth, in the peculiar arrangement of the bar carrying the contact or current-collecting devices, by which thorough insulation is maintained and all escape of current prevented.

Figure 1:
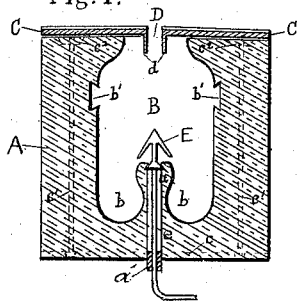
Figure 3:
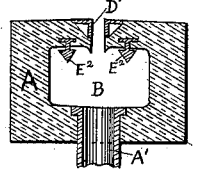
Figure 2:
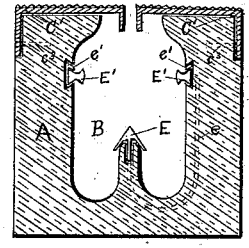
Figure 4:
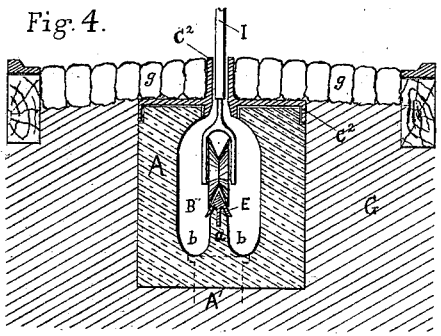
Figure 5:
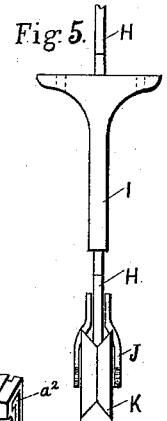
Figure 6:
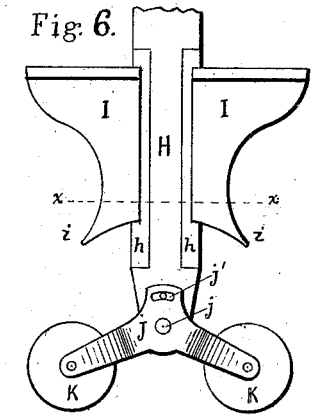
Figure 9:
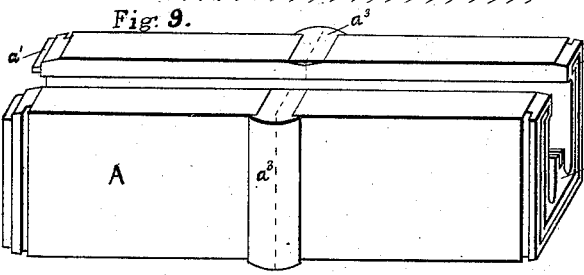
Figure 7:
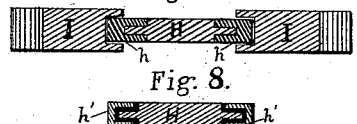
Figure 8:
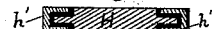
Figure 10:
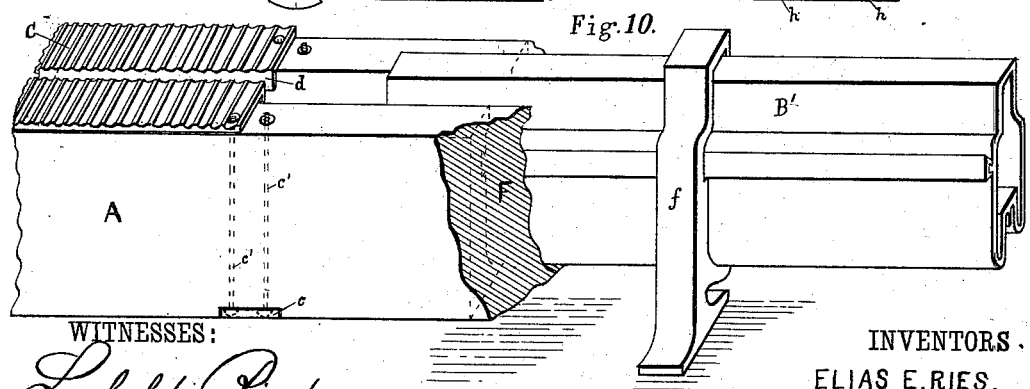
Figure 11:
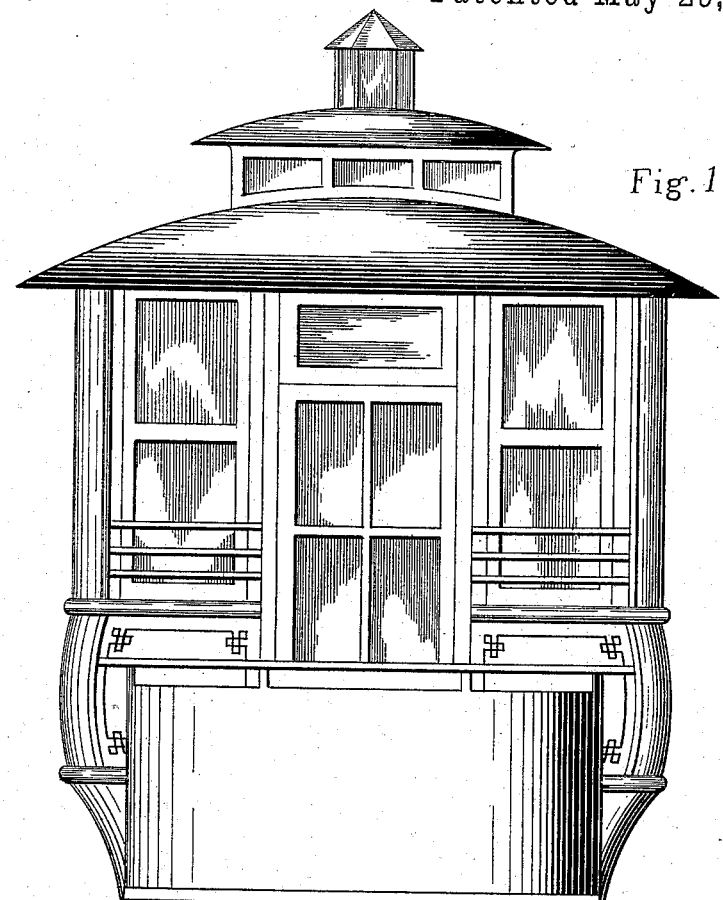
Figure 12:
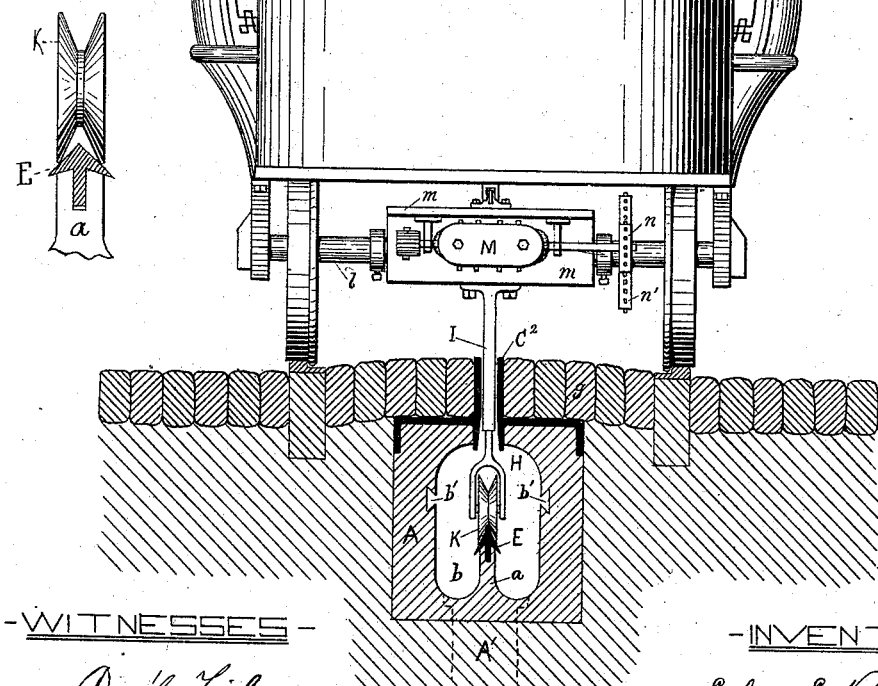

In the drawings accompanying this specification, Figure 1 is a cross-section showing the general form and arrangement of the interior of a conduit designed for a single conducting-rail. Fig. 2 is a cross-section of a similar form of conduit provided with both a single and a double line of conductors. Fig. 3 is a modified form of conduit in which two conductors are used. Fig. 4 is a sectional elevation of a conduit in which the plates forming the conduit-slot are buried beneath the street-surface. Fig. 5 is an end elevation of the conducting-bar and contact-wheels. Fig. 6 is a side elevation of the same, showing the guide-brackets and method of insulating the bar. Fig. 7 is an enlarged sectional view taken on line $x\,x$ of Fig. 6. Fig. 8 is a modified view of the insulation shown in Fig. 7. Fig. 9 is a perspective view of two ready-formed sections of conduit, showing the method of forming and cementing the joints. Fig. 10 is a perspective view illustrating the method employed for constructing the conduit in a single continuous length, and showing, respectively, the finished and unfinished portions thereof. Fig. 11 is a sectional end elevation of the conduit shown in Fig. 4, and a front elevation of a motor-car with the electro-dynamic motor and contact devices in position as applied to ordinary street-surface railways. Fig. 12 is an enlarged detail view of the conducting-rail and grooved contact-wheels.

Similar letters of reference indicate corresponding parts.

Referring to the drawings, A represents the conduit, the material of which is preferably composed of a concrete formed of a mixture of asphaltum and broken or pulverized limestone, or a mixture of asphaltum and silex, or any other similar compound. We desire it understood, however, that we do not limit ourselves to the use of bituminous compounds for this purpose; but any form of concrete, cement, or similar plastic compound or composition that when dry or hardened is a non-conductor of electricity, impervious to water, and capable of withstanding the requisite amount of strain or pressure, will answer the purpose.

The method of forming or constructing the conduit will differ somewhat, according to the nature of the composition or material used. In most cases, however, it is preferred to employ the process shown in Fig. 10, especially when the material, when freshly compounded, is plastic at ordinary temperatures—such, for instance, as the various compounds for making artificial stone and certain other well-known forms of concretes, cements, &c. This process consists in molding and compressing the material while in a plastic state around a movable core, B', the outside of which corresponds in form to the interior, B, of the conduit. The core B' is of suitable length for convenience in handling, and is temporarily supported in position by the frames $f$ while the conduit is being formed about it, and moved forward from time to time as soon as the finished portion of the conduit has set sufficiently to permit it.

In the case of concretes formed of asphaltum and similar substances which are plastic only at high temperatures and require to be subjected to considerable pressure in bringing them to the proper shape and strength, it is preferred to make the conduit in sections of a uniform length, with the conductors already in place, by means of special mechanism, which will form the subject of a future application for Letters Patent. These prepared sections, which may be made of any desired shape or form, can be readily placed in position, the joints between the several sections being made (after the conductors are properly connected) by applying some of the concrete in a fluid state and firmly tamping it about the joint, as shown at $a^3$ in Fig. 9, in which it will be noticed that the respective ends of the several sections are properly matched, so as to fit snugly together without affecting the smoothness of the interior and the top of the conduit, and are also provided with outside grooves and inclined edges for securing a good hold and a proper degree of strength for the joint.

If, instead of using the prepared sections, it be desired to make a continuous conduit of asphaltum or other bituminous concrete, the core B' is made of sheet metal suitably braced, and provided with an interior water-jacket, around which a constant circulation of cold water is kept up, by means of which the interior of the newly-formed portion of the conduit is cooled sufficiently to permit the withdrawal of the core preparatory to forming an additional section. Before the concrete to form any part of the conduit is applied the core B' is dusted over with powdered silica or marble, or coated with any other suitable non-conducting substance that will prevent the asphaltum compound from adhering to the core, and at the same time give the interior of the conduit a smooth finish. When the concrete is applied it is firmly packed around on all sides of the core B', and thoroughly compressed between said core and an inclosing sectional three-sided box or trough, (not shown in the drawings,) which determines the outside shape of the conduit, and which is capable of being taken apart and moved forward when another section of conduit is to be formed.

The drawings illustrate several forms of conduits made as above described, which differ somewhat from each other in certain respects. In the conduits shown in Figs. 1 and 2 the opening along the top is sufficiently wide to permit of ready access to the interior for placing the conductors and making all necessary connections after the conduit proper is finished, and access to the conduit can be readily gained at any future time by removing the plates C C. In the conduit represented in Fig. 4 the conducting-rail can be laid at any time before the plates $C^2 C^2$ are placed in position; but after these plates are laid the interior is inaccessible, except at such points where drainage-pipes or man-holes are provided. In the conduit shown in Fig. 3, which is made entirely of concrete, and is, with the exception of the narrow slot, completely inclosed, the conductors are placed in position during the process of making the conduit, and the several lengths connected as the construction of the conduit proceeds. These conductors are firmly embedded in the conduit, and after being once placed they cannot be removed.

Referring to Figs. 1, 4, and 11, it will be seen that the conduit A, which is made of the non-conducting cement or concrete before described, has an elevation, $a$, running through its entire length, said elevation being provided with a groove or slot in which the electric conductor or rail E is placed. This form of conduit is designed for electric railways of that class which employ an intermediate or third rail as a conductor, using one or both of the track-rails for the return-circuit. The rail E is directly under the slot D, and its exposed surface is $\wedge$-shaped in cross-section, so that water, sand, and other foreign matter that may enter through the slot D will slide off the rail into the troughs $b$ $b$ at either side, from which such foreign matter can be cleared by flooding the lower portion of the conduit whenever necessary, or by attaching a scraper to one of the cars or motors, whereby such matter can be swept into suitable receptacles placed at intervals along the line, from which it can afterward be removed.

The connection between the rail E and the motor is made by means of an insulated sliding bar having grooved contact-wheels, which will shortly be more fully described.

In Fig. 1 the conduit-slot is formed by means of the corrugated surface-plates C C, having a downwardly-projecting flange, $d$, along their inner sides, the object of which flange is to give a broader surface-bearing to the guides I I, Figs. 5, 6, and 7, and to prevent rain from coming in contact with and trickling down the sides of the conduit. The plates C C are secured by means of bolts $c'$ $c'$, passing through the concrete from cross-bars $c$, placed at intervals along the bottom of the conduit, the bolts passing through nuts placed in recesses or sockets $c^2$, formed in the plates C, as shown in Fig. 10.

In Figs. 4 and 11 the plates $C^2 C^2$ are placed upon and straddle the conduit beneath the street-surface, the inner flanges forming the conduit-slot alone reaching the surface. Upon these plates the paving-blocks $g$ are laid, and the spaces between them filled with tar or pitch to prevent lateral movement and side pressure against the slot. By this construction only a very narrow strip of the street-surface is taken up by the conduit, and the street in no way interfered with for ordinary traffic. This object is also attained when the conduit is formed, as in Fig. 3, entirely of concrete. In this instance the walls and the exposed upper surface are of sufficient thickness to withstand the weight and pressure of the street traffic, and the slot, or the concrete (which in this case is preferably a concrete formed of asphalt) on both sides of the slot, is protected from wear by a narrow strip of angle-iron embedded in the concrete and supported therein by webs or flanges, as shown.

In making the conduits with the central elevation, $a$, it is preferred to provide them at the same time with side grooves, $b'b'$, as shown in Figs. 1 and 11, in which conductors can be placed, if it should become necessary to use the railway along which the conduit is laid, either in whole or in part, for motors belonging to other lines of railway that employ a double line of conductors; or, if it is not desired to employ the conduit for the motors of more than one railway, the several conductors can be so combined and connected in their relation to one another and to the generating station or stations that the motors of the railway can be operated according to any desired system. We do not, however, claim in this application the arrangement of two or more lines of independent conductors for operating different classes of electric motors on the same railway, or for operating the railway according to any particular system of main and working conductors, as these features are reserved for future applications for Letters Patent. It is merely intended to show in the present application how the conductors may be applied for this purpose to the particular form of conduits shown. The manner of securing these conductors in place and making electrical connection between any two conductors is shown, respectively, at $e'e'$ and $e$, Fig. 2.

The cable $e$ in Fig. 1 shows the method of tapping the conductor E on suburban roads, where it is desired to utilize part of the current for electric lighting or power at points in the vicinity of or along the line of way. For this purpose holes are left in the elevated support $a$ at proper intervals apart, (said holes being closed so long as they are not required by a removable plug,) through which connection may be made with the conducting-rail at any time without interfering with the interior of the conduit or placing any obstacles in the way of the free passage of the grip or contact devices. All the conduits are provided at proper points with drainage-pipes, as shown at A' in Fig. 3, and in dotted lines in Figs. 4 and 11.

Although the drawings all show the conductors as being supported in longitudinal grooves or channels formed in the body of the conduit, and this construction, on account of the increased strength and steadiness which it imparts to the conductors, is deemed preferable, any other form of independent supports may be used equally as well in this as in other conduits, and we therefore do not exclusively restrict ourselves to the method shown.

Having now described that part of our invention relating to conduits, we will now briefly explain the means employed for taking the current from the underground conducting-rail.

As before stated, the conducting-rail is in the shape of an inverted V. The object in making the rail in this form is not only to prevent sand and other foreign matter from settling upon it, but also to enable better electrical connection to be made by employing grooved contact-wheels, which straddle and make contact with it on both sides, the sides of the grooves in the wheels being for this purpose inclined toward each other at an angle somewhat more acute than that formed by the sides of the conducting-rail. To further insure absolute contact under all conditions, the conducting-bar H, that extends into the conduit from each motor-car, is provided at its lower end with a pivoted yoke, J, having two contact-wheels, K K, one in front and the other in the rear of the bar H. The yoke J, with its contact-wheels, is capable of a slight rocking motion in a longitudinal direction, the amount of said motion being limited by a pin working in the slot $j'$. The bar H, which is capable of vertical motion between the guide-brackets I I, is normally kept depressed by a spring in the motor-car, but is designed to be elevated, so that the wheels K K will be lifted out of contact with the conducting-rail when it is necessary that the flow of electrical current to the motor be interrupted—as, for example, when it is desired to stop the car. We do not, however, confine ourselves to this arrangement, as in some instances, especially when a current of high potential is employed, or when the motors are to be operated in "series," it may be preferable to keep the wheels K K constantly in contact with the conducting-rail and control the flow of current to the motor by means of a suitable switch.

It will be evident that when two parallel conducting-rails are to be employed in the conduit—as, for example, in Fig. 3—the yoke J is provided with two pairs of contact-wheels, which in this case are insulated from each other and connected with their respective motor-terminals in any suitable manner.

It will thus be seen that the wheels K K, being self leveling, or, in other words, capable of assuming a horizontal position irrespective of the inclination of the bar H, are held in close contact with the conducting rail or rails without regard to any vibration or jumping motion due to unevenness of the roadway, and that by this arrangement four points are normally in contact with each conducting-rail, thereby preventing to a great degree the damage from sparking in passing over defective spots in the conducting rail or rails.

In Fig. 11 the motor M is shown secured to a metallic frame, m, that is supported on the axles of the car, and the armature-shaft of the motor is arranged to impart motion to one or both of the axles by means of any suitable intermediate mechanism, the particular arrangement of such mechanism forming no part of our present invention. The object of this construction is to prevent the vibration or swaying motion of the car body from interfering with the smooth operation of the driving mechanism. The guide frames I I, when this construction is employed, are firmly secured to the frame m in such a position that the sliding bar H will be directly under the forward axle of the motor-car and midway between the track-rails, in order that it may not be thrown out of line with the conduit-slot when the motor-car is rounding a curve.

In order to prevent any escape of current from the bar H to the metal plates forming the conduit-slot, this bar is made thinner than the guide-brackets, so that it is always held in the approximate center of the slot, and is also insulated from the guides I I by insulating material h, as shown in Figs. 7 and 8. The guides I I, which, it will be seen, enter and extend a short distance below the conduit-slot, are provided with downwardly and outwardly projecting ends i i, as shown, for instance, in Letters Patent No. 310,962, dated January 20, 1885, and in application Serial No. 189,631, the object of which is to clear away all foreign matter that may lie across the conduit-slot, and to prevent short-circuiting the current between the bar H and the earth by means of the guides and the surface-plates, in case of heavy rains, by causing any water adhering to the sides of the conduit-slot, which otherwise would spread itself over the guides and sliding bar, to run down to and drop off the projecting ends i i into the conduit.

We claim as our invention—

1. In an electric railway, a longitudinally-slotted conduit formed entirely of non-conducting concrete or cement, and having longitudinal grooves or channels formed therein to receive and hold the conducting rail, substantially as set forth.

2. In an electric railway, a longitudinally-slotted conduit extending along the line of way, the walls of which are formed entirely of non conducting water-proof concrete or cement, and one or more naked electric conductors embedded in the walls of said conduit and having a part of their surface exposed, substantially as set forth.

3. In an electric railway, the combination of a longitudinally-slotted conduit extending along the line of way and formed entirely of non-conducting water-proof material, said conduit having one or more partially-exposed naked conductors embedded therein and traversing its interior in a direction parallel with said slot, and depending contact or current-collecting devices on a moving car or motor adapted to enter said slot and make connection with such conductor or conductors.

4. In an electric railway, the combination of an underground conduit formed of insulating or non conducting material extending along the line of said railway and having an interior longitudinal elevation formed integral therewith and provided with a groove or channel formed therein, and an electric conductor adapted to enter said groove and be removably but securely held therein by virtue of gravity without danger of accidental displacement.

5. In an electric railway, an underground conduit having a centrally-supported conducting-rail, and provided at intervals with normally-sealed openings extending through the interior of the central support or supports, through which openings electrical connection can be made between the conducting-rail and exterior translating devices, substantially as and for the purpose set forth.

6. In an electric railway, an underground conduit for the conductors thereof formed of non-conducting water-proof concrete or cement, and provided with an interior longitudinal elevation formed integral therewith and having a groove for receiving an electric conductor, said elevation extending along the bottom of the conduit and dividing the lower portion thereof into drainage-channels, substantially as set forth.

7. In an electric railway, the combination, with an underground conduit having a central longitudinal surface opening or slot extending along its entire length and provided with an interior ridge or elevation extending along the bottom of the conduit, of an insulated $\wedge$-shaped electric conductor supported by said elevation directly under the surface-opening, and a channel at each side of said conductor designed to receive the surface-drainage, and provided at intervals with a common outlet, substantially as set forth.

8. In an electric railway, the combination of an insulated conducting-rail extending along the line of way, and having its exposed contact or rubbing surface $\wedge$-shaped in cross-section, and one or more contact wheels or pulleys provided with a V-shaped groove, and designed and adapted to move along said rail in contact with both sides of its exposed surface, the sides of said conducting-rail being pitched or inclined at an angle different from and less acute than that of the V-shaped groove in the contact wheel or wheels.

9. In an electric railway, the combination of a longitudinally-slotted underground conduit extending along the line of said railway, and a vertically-adjustable bar on a motor or car having grooved pulleys or contact-wheels pivoted to its lower end and designed and adapted to enter said slotted conduit and make electrical contact with one or more $\wedge$-shaped insulated conductors supported therein, said contact-wheels being grooved at an angle more acute than that formed by the sides of the conductor or conductors, substantially as set forth.

10. An underground conduit for the conducting rail or rails of an electric railway, having a longitudinal opening or slot along its upper surface, and formed entirely of prepared sections of suitable length made from non-conducting or insulating concrete or cement, said sections being placed end to end and secured to each other by a joint of similar material in a plastic state in such a manner that both the interior and the exterior upper surface of the conduit remain perfectly smooth, substantially as and for the purpose set forth.

11. In an electric railway, a vertically-adjustable grip or contact bar capable of vertical motion between guides secured to and depending from a moving car or motor, said bar having at its lower end a centrally-pivoted yoke or rocking lever provided with contact wheels or pulleys, substantially as set forth, said contact-wheels, by reason of their pivoted connecting-yoke, being capable of adjusting themselves to inequalities in the conducting rail or rails and to irregularities of motion due to an uneven roadway, and thereby lessen or obviate the damage caused by interruptions in contact and consequent sparking.

12. In an electric railway, the combination, with a motor or car adapted to travel on said railway, of a longitudinally-slotted conduit extending along the line of said railway and having one or more electric conductors therein, and a depending vertically-adjustable bar extending through the slot from said motor or car and having at its lower end a pivoted yoke or rocking lever provided at its respective extremities with contact-wheels or current-collecting devices designed and adapted to make electrical contact with the conductor or conductors in the said conduit, substantially as and for the purpose set forth.

13. In an electric railway, the combination of a conduit having a longitudinal slot, an insulated vertically-guided bar entering said slot and adapted to make connection with an electric conductor carried in the conduit, and depending guides or supporting-brackets also entering said slot and provided with ways or channels between which the conducting-bar is free to slide, substantially as set forth.

14. In an electric railway, the combination of a longitudinally-slotted conduit extending along the line of said railway and having one or more electric conductors therein, depending guide-brackets on a moving car or motor and adapted to enter said longitudinal slot, a vertically-adjustable conducting-bar also carried by said car or motor and adapted to enter the slot between said guide-brackets, and insulating material between the said bar and the guide-brackets, substantially as and for the purpose set forth.

15. In an electric railway, the combination of a conduit having a narrow longitudinal slot, a motor or car having depending brackets or guides of such thickness as to nearly fill the width of the slot, and an insulated conducting-bar capable of vertical motion between such guides, but somewhat thinner in cross-section, and adapted to enter the conduit between the sides of the slot and without coming in contact therewith, substantially as set forth.

16. In an electric railway, the combination, with the conducting rail or rails, of the conducting-bar H, the yoke or rocking lever J, with its contact-wheels K K, and the slot $j$ and pin $j'$, to limit the rocking motion of the yoke or lever, substantially as set forth.

In testimony whereof we have hereunto signed our names in presence of two subscribing witnesses.

ELIAS E. RIES.
ALBERT H. HENDERSON.

Witnesses:
MURRAY HANSON,
WILLIAM H. BERRY.